United States Patent
Watanabe

[19]

[11] Patent Number: 5,983,040
[45] Date of Patent: *Nov. 9, 1999

[54] CAMERA WITH CARTRIDGE CHAMBER COVER HAVING PRESS-FITTED FRICTION PIECE

[75] Inventor: Atsushi Watanabe, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/786,278

[22] Filed: Jan. 22, 1997

[30] Foreign Application Priority Data

Jan. 29, 1996 [JP] Japan ..................................... 8-012585

[51] Int. Cl.⁶ ..................................................... G03B 17/02
[52] U.S. Cl. ................................ 396/538; 16/74; 16/86 R
[58] Field of Search ...................................... 396/535, 536, 396/538, 539; 16/49, 50, 86 R, 86 A, 86 B, 74

[56] References Cited

U.S. PATENT DOCUMENTS 4,354,611  10/1982  Propst et al. ............................ 16/74 X
5,563,673  10/1996  Aoshima ............................. 396/538 X

FOREIGN PATENT DOCUMENTS 3296029  12/1991  Japan .
  41625   1/1992  Japan .
 470637   3/1992  Japan .
7199339   8/1995  Japan .

*Primary Examiner*—Howard B. Blankenship
*Attorney, Agent, or Firm*—Robin, Blecker & Daley

[57] ABSTRACT

A camera comprises a cover of a stowage chamber, such as a film cartridge chamber, and a friction member for giving substantially constant opening-operation resistance to the cover substantially throughout the entirety of a movement range in which the cover shifts from a closed state to a half-opened state, so that the cover is gradually opened by the friction force of the friction member. Thus, an object stored in the stowage chamber is prevented from abruptly popping out of the stowage chamber, and a user's feeling at the time of using the camera is improved. Moreover, the friction member is constituted by a rubber member made of silicone rubber or the like. Thus, the considerable miniaturization of the camera is achieved.

16 Claims, 4 Drawing Sheets

CAMERA WITH CARTRIDGE CHAMBER COVER HAVING PRESS-FITTED FRICTION PIECE

BACKGROUND OF THE INVENTION

1. Field of the Invention

This invention generally relates to a camera and, more particularly, to a camera that has a stowage (or storage) chamber, into which a film cartridge can be loaded, and a cover (or lid) of the stowage chamber.

2. Description of Related Art

Some cameras are of the type in which a film cartridge is loaded into a cartridge chamber in the axial direction of the film cartridge. Further, most of the cameras of such a type have mechanisms for facilitating the taking-out of the film cartridge from the cartridge chamber by pushing the film cartridge out of the cartridge chamber by the force of a spring or the like when a cover of the cartridge chamber (hereinafter sometimes referred to as the cartridge chamber cover) is opened.

However, in a case where such a mechanism for pushing the film cartridge out of the cartridge chamber is provided in a camera, there is a fear that the film cartridge is popped (or sprung) out of the cartridge chamber just when the cover of the cartridge chamber is opened. Further, even in the case of a camera which is not provided with the pushing-out mechanism, if an opening (or aperture) of the cartridge chamber opens downwardly, there is a fear that the film cartridge falls therefrom just when the cover is opened, and as a result, the film cartridge is damaged. Thus, there has been proposed a pop-out preventing mechanism for preventing a film cartridge from popping out of or falling from a cartridge chamber by engaging and stopping the cover, which is partly (or half) opened, with a clicking means and subsequently, bringing the film cartridge into an abutting engagement with the cover, as disclosed in, for example, Japanese Laid-open Patent Application No. Hei 7-199339.

However, the pop-out preventing mechanism proposed in the aforementioned patent application employs a plate (or leaf) spring as the clicking means. Thus, there is the necessity of using a plate spring which is actually large to some extent, so as to cause a spring pressure (or force) required to prevent the film cartridge from popping out of or falling from the cartridge chamber.

Therefore, a space which is specifically provided for mounting the plate spring and parts needed to fix the plate spring to the camera are required. However, there is caused a problem that such a space and parts are obstacles to the miniaturization (or the reduction in size (and weight)) of a camera. Moreover, most of plate springs have insufficient durability.

In addition, in the case of the aforementioned pop-out preventing mechanism, the cover is brought into a partly opened state at a stroke. Thus, there is a fear that a user who is unfamiliar with such a camera may worry that the film cartridge might pop out of or fall from the camera.

BRIEF SUMMARY OF THE INVENTION

In accordance with an aspect of the present invention, there is provided a camera which comprises a cover of a stowage chamber, and a friction member for giving substantially constant opening-operation resistance to the cover substantially throughout the entirety of a movement range in which the cover shifts from a closed state to a half-opened state, so that a frictional force of the friction member causes the cover to open gradually and an object stored in the stowage chamber is prevented from abruptly popping out of or falling from the stowage chamber, so as to improve the user's feeling at the time of using the camera.

In accordance with another aspect of the present invention, there is provided a camera which comprises a cover of a stowage chamber, and a rubber member for giving opening-operation resistance to the cover, so that a resistance force of the rubber member acts on the cover during an opening operation of the cover, so as to improve the user's feeling at the time of using the camera and to attain the miniaturization of the camera.

These and further aspects and features of the present invention will become apparent from the following detailed description of the preferred embodiment thereof with reference to the accompanying drawings.

DETAILED DESCRIPTION OF THE INVENTION

Hereinafter, a preferred embodiment of the present invention will be described in detail by referring to the accompanying drawings.

Figure 1:
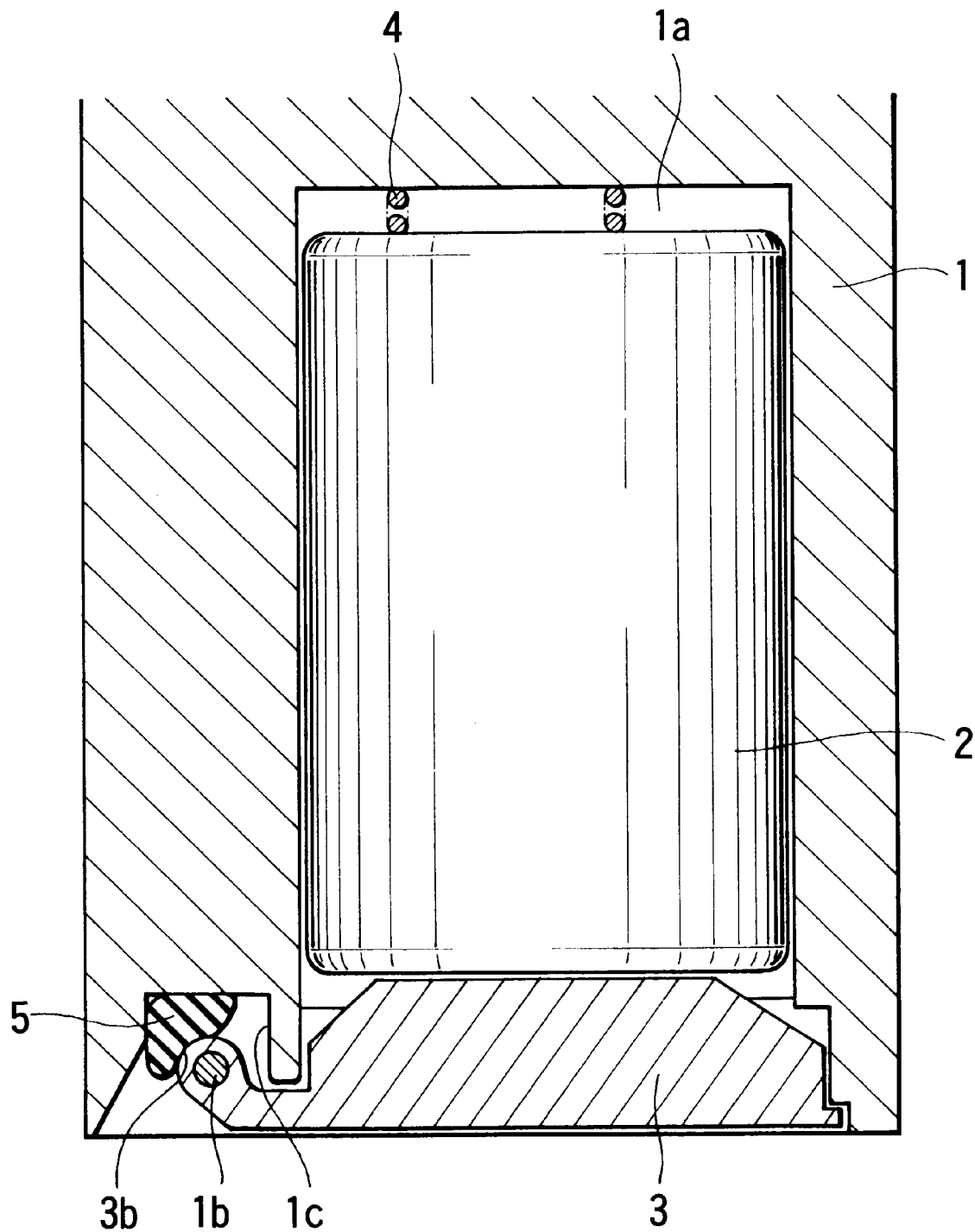
FIG. 1 is a sectional view showing the periphery of a cartridge chamber of a camera according to an embodiment of the present invention.
Figure 2:
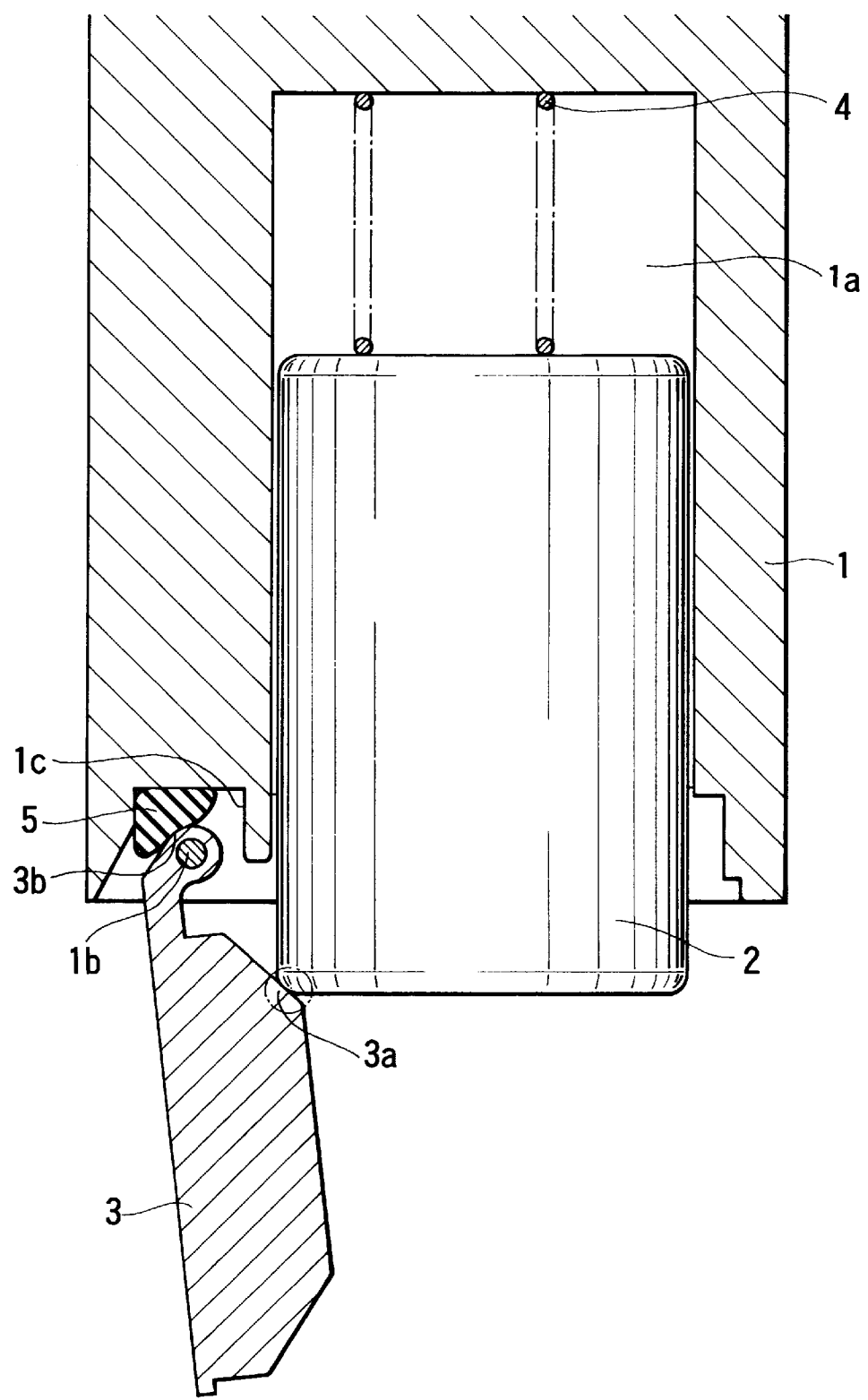
FIG. 2 is a sectional view showing the periphery of the cartridge chamber in another operation.
Figure 3:
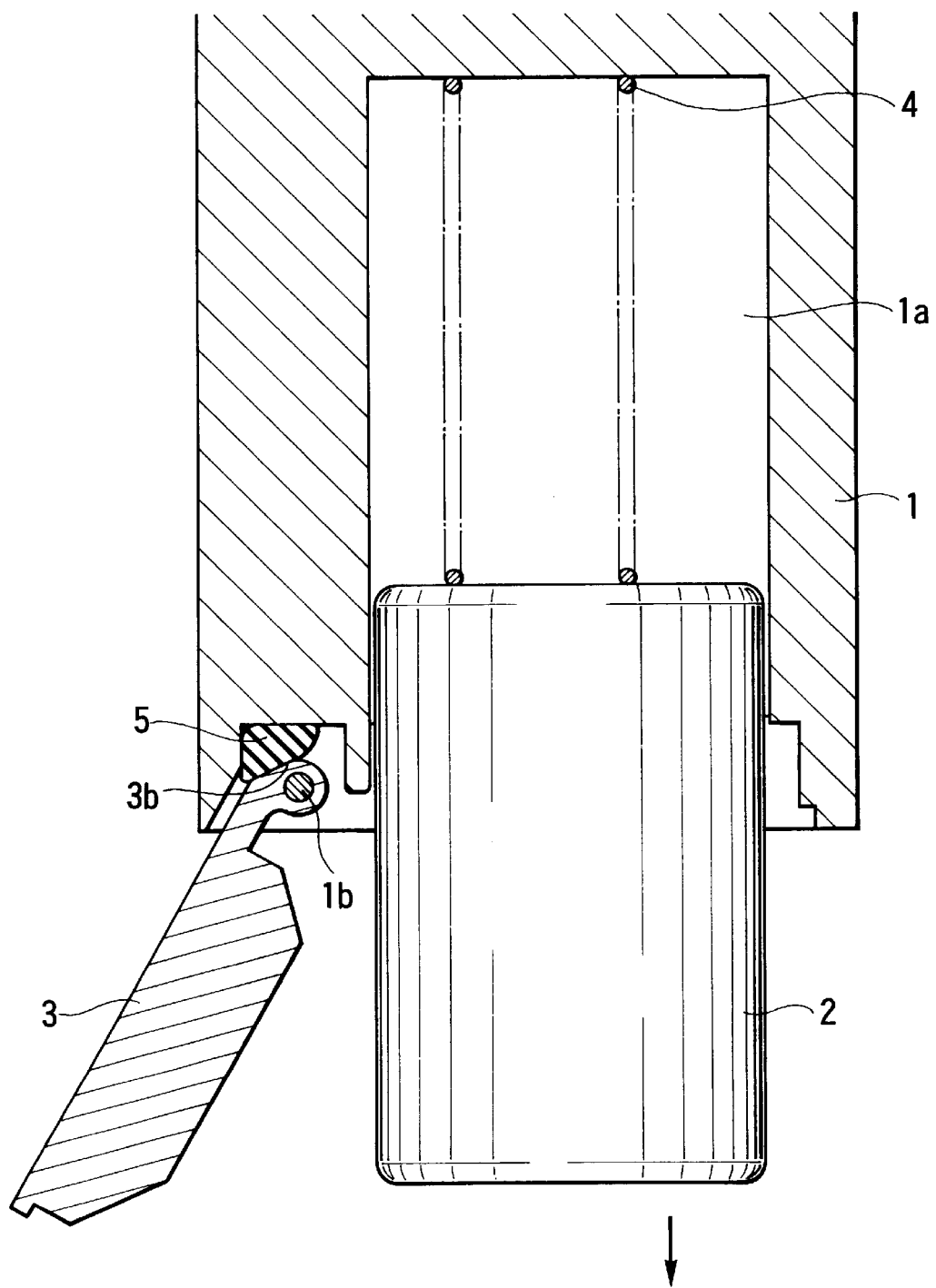
FIG. 3 is a sectional view showing the periphery of the cartridge chamber in a further operation.

FIGS. 1 to 3 illustrate the periphery of a cartridge chamber of a camera according to the embodiment of the present invention. In these figures, there are illustrated a camera body 1, a cartridge chamber 1a which is provided in the camera body 1 and opens downwardly, and a film cartridge 2 to be loaded into the cartridge chamber 1a in the direction of a spool shaft of the film cartridge 2.

A cartridge chamber cover 3 is provided for opening and closing an aperture (or opening) of the cartridge chamber 1a. Further, a recess (or concave) part 1c is formed at a side of the opening of the cartridge chamber 1a in the camera body 1. Moreover, a shaft 1b, which penetrates a hinge portion of the cartridge chamber cover 3 and supports the cover 3 in such a manner as to be able to open and close the cover 3, is laid across the hinge portion of the cover 3 in the recess portion 1c. The hinge portion of the cartridge chamber cover 3 is resident inside the recess portion 1c irrespective of whether the cartridge chamber cover 3 is opened or closed. Thus, the hinge portion is never exposed to the external environment of the camera body 1. Consequently, the outside appearance of the camera is not spoiled.

An eject spring 4 is disposed on the top of the cartridge chamber 1a. When the cartridge chamber cover 3 is closed as illustrated in FIG. 1, the eject spring 4 is compressed by the film cartridge 2 which is loaded into the cartridge chamber 1a. Incidentally, a locking means (not shown) for locking the cartridge chamber cover 3, which is in the closed state thereof, is provided in the camera body 1.

Furthermore, when the cartridge chamber cover 3 is opened as illustrated in FIGS. 2 and 3, the eject spring 4 pushes the film cartridge 2 in such a direction as to eject the film cartridge 2 from the cartridge chamber 1a.

Figure 4:
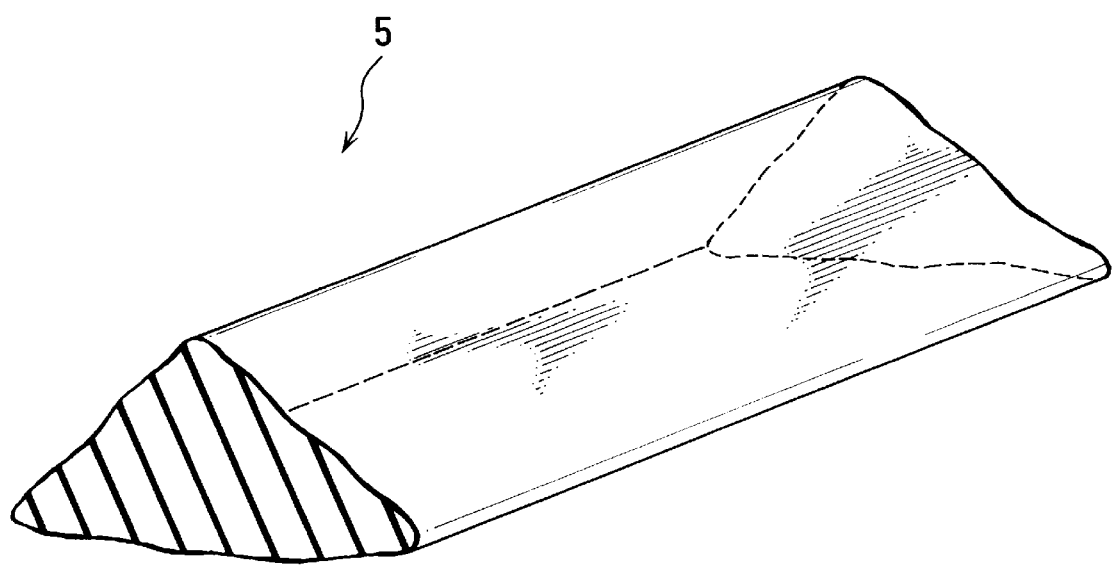
FIG. 4 is a perspective view of a friction piece used in the camera.

Reference numeral 5 denotes a friction piece which is shaped like a triangular prism as shown in FIG. 4 and is made of a high friction material such as silicone rubber. In the case of using silicone rubber, it is preferable for securing the sufficient durability that the silicone rubber of a hardness number of 30 to 70 is used.

The friction piece 5 is press-fitted into a space between an inner wall of the recess portion 1c and the hinge portion of the cartridge chamber cover 3. Two surfaces of the friction piece 5, which are orthogonal to each other, are brought into abutment with the inner wall of the recess portion 1c. Moreover, a slanting surface of the friction piece 5 intersecting with these two orthogonal surfaces is brought into abutment with the hinge portion of the cartridge chamber cover 3. Incidentally, the slanting surface of the friction piece 5 is somewhat deformed as a result of being pressed against the hinge portion of the cartridge chamber cover 3.

Thus, a dedicated space for containing the friction piece 5 is saved by enclosing the friction piece 5 in a space included in the recess portion 1c, which would become a dead space in the conventional cameras. Accordingly, the size of the camera can thus be reduced by that arrangement. Further, because the friction piece 5 is maintained in a state in which the piece 5 is press-fitted into the space between the inner wall of the recess portion 1c and the hinge portion of the cartridge chamber cover 3, a dedicated means for fixing the friction piece 5 is unnecessary. This facilitates the assembly of the camera.

With the camera configured as above described, when releasing the locking means (not shown) in the state shown in FIG. 1, the film cartridge 2 and the cartridge chamber cover 3 are pushed by the pressing force of the eject spring 4. Thereby, the cartridge chamber cover 3 performs an opening operation (namely, is opened). However, a large friction force, which is sufficient to the extent that the cartridge chamber cover 3 is gradually opened against the pressing force of the eject spring 4, is generated on a sliding contact part 3b, which makes contact with the friction piece 5, of the hinge portion of the cartridge chamber cover 3. Thus, the cartridge chamber cover 3 gradually opens from the closed state and then comes into the state shown in FIG. 2. Consequently, a sense of security and a feeling of quality are given to a user of the camera by slowly opening the cartridge chamber cover 3 in this way.

Further, in the state shown in FIG. 2, the cartridge chamber cover 3 is in the half-opened state, in which the cover 3 is opened and tilts nearly 90 degrees from the closed position of FIG. 1. However, the film cartridge 2 is brought into abutment with a holding part 3a formed on the inner side of the cartridge chamber cover 3, so that the cartridge 2 is prevented from popping out of or falling from the cartridge chamber 1a. In this state, the friction resistance to the cartridge chamber cover 3 and the pressing force of the eject spring 4 are balanced, so that, unless the cartridge chamber cover 3 is operated to be fully opened, the film cartridge 2 is not further pushed out from the chamber 1a.

Then, when the user opens the cartridge chamber cover 3 completely by hand, the film cartridge 2 is further pushed out from the cartridge chamber 1a by the eject spring 4 as is shown in FIG. 3. Thus, the user can easily take out the film cartridge 2 from the cartridge chamber 1a.

As above described, in accordance with the configuration of the aforementioned embodiment, the camera is provided with the friction member for giving substantially constant opening-operation resistance to the cover substantially throughout the entirety of a movement range in which the cover shifts from a closed state to a half-opened state. Thus, in accordance with the present invention, the cover is made to open gradually, by using a simple configuration. Thereby, the cartridge is securely prevented from abruptly popping out of or falling from the chamber. Moreover, a sense of security and a feeling of quality are given to a user of the camera.

Further, in accordance with the aforementioned embodiment, the small friction member is held between the hinge portion of the cover and the inner wall of the recess portion provided in the camera body so as to receive the hinge portion. Thus, a space included in the recess portion 1c, which would become a dead space in the conventional camera, is effectively utilized. Moreover, components such as screws for fixing the friction member are unnecessary. This facilitates the miniaturization and assembly of the camera.

Furthermore, the durability of the friction member is enhanced by using silicone rubber, whose hardness is at a constant level, as the material of the friction member, in comparison with the conventional camera of employing a plate spring as the friction member.

Additionally, as a result of making the friction member, which has a high coefficient of friction, slide on and get contact with the hinge portion of the cover, the cover is adapted to gradually open from the closed state. Thereby, the cartridge is prevented from popping out of the chamber. In addition, a sense of security and a feeling of quality are given to a user of the camera.

Incidentally, in the case of the embodiment described hereinabove, the friction force acts on the part 3b even when the cartridge chamber cover 3 is in the closed state. The camera, however, may be adapted so that the friction force is little or does not act on the cartridge chamber cover 3 when the cartridge chamber cover 3 is in the closed state or during movement the cover 3 in a region close to the closed state, and that the friction force of a predetermined strength acts on the part 3b when cover 3 moves from the close proximity to the closed state to the opened state.

Additionally, in the case of the aforementioned embodiment, the camera employs the friction member (namely, the friction piece 5), which is shaped like a triangular prism and is made of silicone rubber. However, the material and shape of the friction member of the present invention are not limited thereto. Moreover, in the case of the aforementioned embodiment, the camera is of the type in which the film cartridge is loaded in the direction of the spool shaft thereof. The present invention, however, can be applied to cameras of other types.

Furthermore, in the case of the aforesaid embodiment, the camera is provided with a means for pushing out the film cartridge from the cartridge chamber. However, the present invention can be applied to cameras of the type that does not have such a means, for example, to a camera in which a cartridge chamber opens downwardly from a camera body and in which a cartridge chamber cover is opened owing to the weight of a film cartridge.

Additionally, the present invention may be applied to covers or lids other than the film cartridge chamber cover. For instance, the present invention may be applied to a cover of a battery stowage chamber.

Further, the present invention can be applied to cameras of various types, such as a single-lens reflex camera, a lens shutter camera and a video camera. Moreover, the present invention can be applied to optical apparatuses other than cameras and further to other devices. Furthermore, the present invention can be applied to composing elements of the cameras, the optical apparatuses and the devices.

Besides, the aforementioned embodiment of the present invention, the modifications thereof and the composing elements thereof may be combined with each other, if necessary.

Further, it should be understood that the configurations of the apparatuses and devices of the present invention are not limited to the configuration of the aforementioned embodiment but may be any configurations of apparatuses and devices, which can achieve the functions of the mechanisms recited in the appended claims or of the embodiment of the present invention, and that other modifications will be apparent to those skilled in the art without departing from the spirit of the invention.

The scope of the present invention, therefore, should be determined solely by the appended claims.

I claim:

1. A camera comprising:
    a cover of a stowage chamber;
    a friction member for giving substantially constant opening-operation resistance to said cover substantially throughout the entirety of a movement range in which said cover shifts from a closed state to a half-open state; and
    holding means formed from a part of said cover and a part of a body of said camera for holding said friction member so that said friction member is in a compressed and deformed state, but otherwise unmovable, all the time during the shifting of said cover.

2. A camera according to claim 1, wherein said cover includes a cover of a film cartridge chamber into which a film cartridge is to be loaded.

3. A camera according to claim 1, wherein: said part of said cover is a hinge portion of said cover; and said friction member gives substantially constant opening-operating resistance to said cover by coming into sliding contact with said hinge portion of said cover.

4. A camera according to claim 3, wherein said part of said body is the inner wall of a recess formed in said body of said camera, said hinge portion is mounted in said recess formed in said body of said camera, and wherein said friction member is held between said inner wall of said recess and said hinge portion.

5. A camera according to claim 4, wherein said friction member is shaped in a triangular prism having two orthogonal surfaces which are brought into abutment with the inner wall of said recess portion, and a slanting surface which is brought into abutment with said hinge portion.

6. A camera according to claim 1, wherein said friction member is made of rubber.

7. A camera according to claim 1, wherein said friction member is made of silicone rubber.

8. A camera according to claim 2, further comprising pushing-out means for pushing out the film cartridge from within said body of said camera.

9. A camera according to claim 1, wherein said friction member gives substantially constant opening-operation resistance to said cover at least in a movement range in which said covers shifts from the closed state to a state in which an object stowed in said stowage chamber retreats from a space through which said object passes when said object goes out of said stowage chamber.

10. An apparatus comprising:
    a cover operable for opening and closing movement;
    a friction member for giving substantially constant opening-operation resistance to said cover substantially throughout the entirety of a movement range in which said cover shifts from a closed state to a half-open state; and
    holding means formed from a part of said cover and a part of a body of said apparatus for holding said friction member so that said friction member is in a compressed and deformed state, but otherwise unmovable, all the time during the shifting of said cover.

11. A camera having a hinge part, comprising:
    a cover of a stowage chamber, said cover having a hinge portion engaged with said camera hinge part for supporting movement of said cover relative to said camera;
    a deformable member in said camera and in frictional engagement with said cover hinge portion; and
    a holding means formed from a part of the hinge portion and a part of a body of said camera for holding said deformable member so that said deformable member is in a compressed and deformed state, but otherwise unmovable, all the time during the shifting of said cover.

12. A camera according to claim 11, wherein said deformable member is configured to give substantially constant opening-operation resistance to said cover substantially throughout the entirety of a movement range in which said cover shifts from a closed state to a half-open state.

13. A camera having a hinge part, comprising:
    a cover of a stowage chamber, said cover having a hinge portion engaged with said camera hinge part for supporting movement of said cover relative to said camera;
    a rubber member nested in said camera and in frictional engagement with said cover hinge portion; and
    a holding means formed from a part of said hinge portion and a part of the body of said camera for holding said rubber member so that said rubber member is in a compressed and deformed state, but otherwise unmovable, all the time during shifting of said cover.

14. A camera according to claim 13, wherein said rubber member is configured to give substantially constant opening-operation resistance to said cover substantially throughout the entirety of a movement range in which said cover shifts from a closed state to a half-open state.

15. A camera comprising:
    a cover of a stowage chamber;
    a friction member for giving substantially constant opening-operation resistance to said cover substantially throughout the entirety of a movement range in which said cover shifts from a closed state to a half-open state by coming into sliding contact with a hinge portion of said cover; and
    said hinge portion being mounted in a recess portion formed in a body of said camera, and said friction member being held between an inner wall of said recess portion and said hinge portion.

16. A camera having a hinge part, comprising:
    a cover of a stowage chamber, said cover having a hinge portion engaged with said camera hinge part for supporting movement of said cover relative to said camera; and
    a deformable member in said camera and in frictional engagement with said cover hinge portion; and
    said cover hinge portion being mounted in a recess portion formed in a body of said camera, and said deformable member being held between an inner wall of said recess portion and said cover hinge portion.

* * * * *

UNITED STATES PATENT AND TRADEMARK OFFICE
CERTIFICATE OF CORRECTION

PATENT NO. : 5,983,040
DATED : November 9, 1999
INVENTOR(S) : Atsushi Watanabe

It is certified that error appears in the above-identified patent and that said Letters Patent is hereby corrected as shown below:

Abstract, line 12, before "considerable" delete -- the --.
Col. 6, line 33, delete "of the body" and insert -- of a body --.

Signed and Sealed this

Tenth Day of April, 2001

Attest:

NICHOLAS P. GODICI

Attesting Officer      Acting Director of the United States Patent and Trademark Office